Patented Feb. 13, 1951

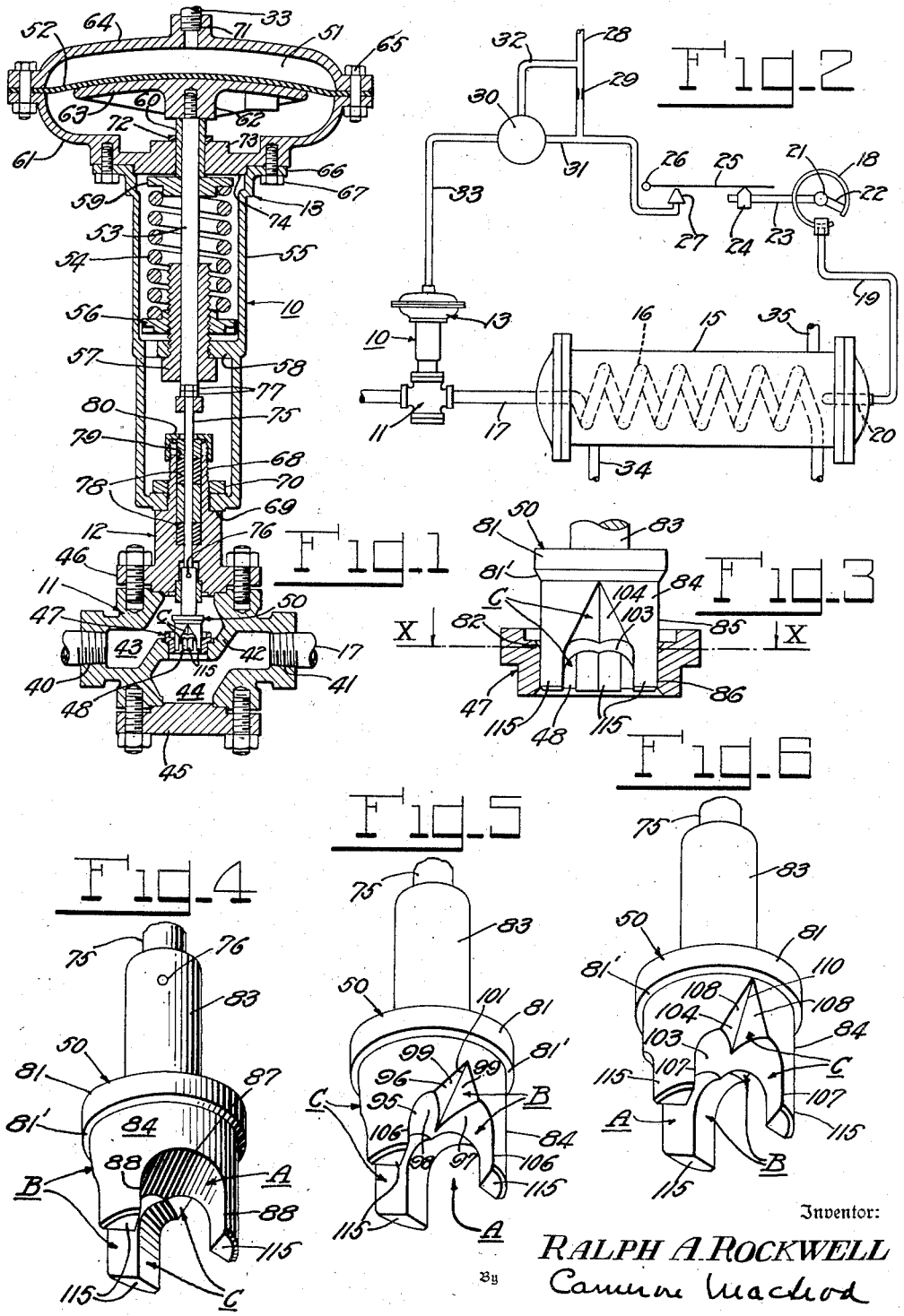

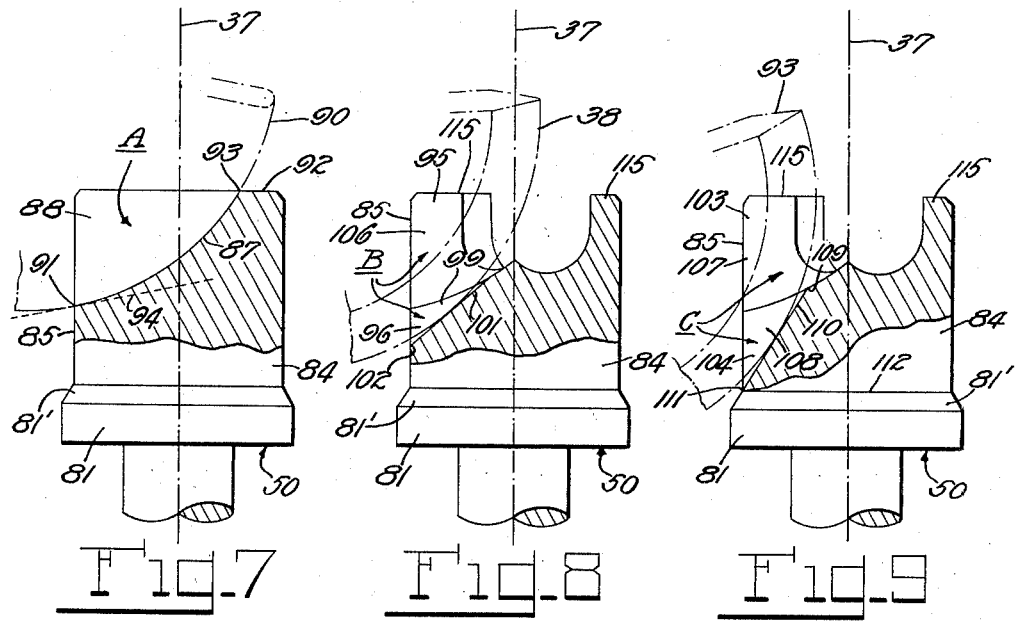
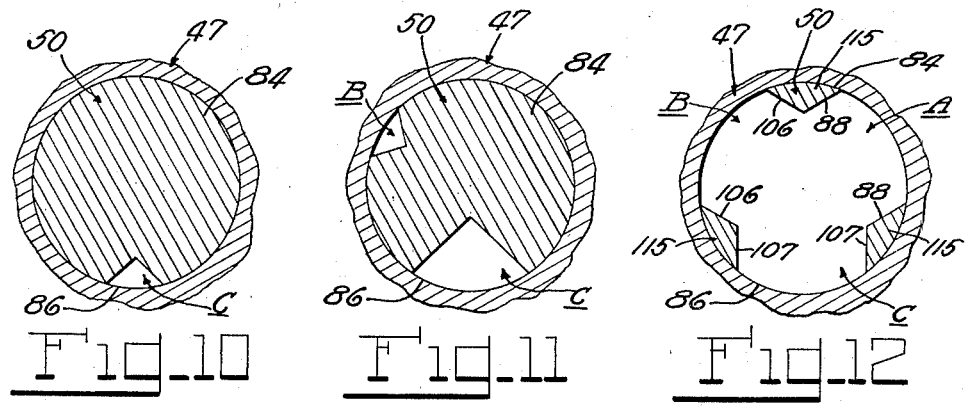

2,541,176

UNITED STATES PATENT OFFICE 2,541,176

CONTROL VALVE

Ralph A. Rockwell, Hingham, Mass., assignor to Mason-Neilan Regulator Company, Boston, Mass., a voluntary association of Massachusetts Application January 22, 1945, Serial No. 573,839

7 Claims. (Cl. 251—34)

This invention relates to valves for regulating fluid flow and particularly concerns valve means which are characterized to vary fluid flow over a wide range of flow change with desirable and reproducible results.

More specifically, this invention pertains to valves which may be adapted to vary fluid flow with extreme accuracy over a wide flow range on a basis wherein the logarithm of the flow is proportional to the plug movement or, in other words, on an equal percentage basis in respect to plug lift, the valves embodying this invention being so arranged and constructed that they are particularly adapted to be produced in small sizes, on the order of 1/8" to 3/4", inclusive, by standard machine tool equipment and with allowable dimensional variations within established machine tolerances without substantially affecting the equal percentage flow characteristic referred to.

It will be understood by those skilled in the art that it may be desirable that the valve plug actuating mechanism, whether it be hand means or automatic means, be capable of effecting each quantity change in fluid flow, per unit of valve movement, on the same proportional relative basis to the quantity flowing just prior to the change throughout the major portion of the plug movement. With a valve so characterized, equal increments of plug movement or lift, either dictated by hand or by a control mechanism, have a uniform degree of proportional sensitivity throughout the major portion of the operating range. Thus a controller responsive to a change in the value of a process and functioning together with a motor operated valve for varying fluid flow to or from the process as required to maintain a selected process value, is capable of effecting proportional changes in fluid flow with equal sensitivity substantially throughout its operating range. For example, a diaphragm operated control valve for varying fluid flow to a process and thereby effecting a change in the process value, may be governed by a controller, responsive to a change in the process value, by which fluid operating pressure on the control valve diaphragm is varied proportionally to the departure of the process value from a selected setting for the purpose of returning the said value to normal. Since the operating pressure on the diaphragm may be varied over a selected range to actuate the control valve plug between fully open and closed positions, a unit of operating pressure change corresponds with a unit of plug movement and therefore the operating pressure changes dictated by the controller are substantially linear with plug lift. However, if the quantity change in the flow of fluid through the control valve is on an equal percentage basis with plug lift, all units of diaphragm pressure change throughout the operating pressure range have a substantially equal corrective effect on the process value whether the process load is high and the control valve is operating at a comparatively large opening or whether the process load is medium or low and the valve is operating at smaller openings. This is an important factor in process control for if the sensitivity of the controller to process value change is such that the control is stable under large process demands for example, the control will be equally stable under medium and low process demands. For this reason it is recognized that a valve capable of varying fluid flow on an equal percentage basis lends itself particularly to automatic control and it will be appreciated that it is just as important that this principle of valve operation be applied to small control valves as to valves of larger size.

Heretofore, so far as I have been able to ascertain, it has not been practical to produce equal percentage valves in small sizes which are capable of giving accurate results when manufactured on a quantity basis with standard machine tool equipment allowing for dimensional variations within the usual machine tolerances. One common type of equal percentage valve suitable for manufacture in sizes from one inch up is a so-called V-port valve construction which includes a valve plug having a skirt provided with ports which are shaped to vary fluid flow on an equal percentage basis in respect to plug lift. Another type of valve in common use includes a well-known parabolic valve plug which may be produced by standard equipment in larger sizes to give the desired flow characteristic, but which, even in larger sizes, is more exacting to manufacture since changes of a few thousandths of an inch on the external contour of the valve plug have a substantial effect on its flow characteristics. However, so far as known to me, it has not been practical to produce either the skirted V-port plug or the parabolic plug in sizes much below one inch because, in the one case, the skirt diameter is too small to permit the use of a practical form of milling tool or casting and, in the other case, the dimensional requirements become more and more exacting since the required accuracy increases in geometric progression and in small sizes the machine tolerances become so small as to be impractical for quantity production. Furthermore in the parabolic construction, minute dimensional changes due to normal wear caused by errosive action of the flowing fluid have an appreciable effect on the flow characteristics.

For the reasons outlined above a variety of so-called needle valves have been accepted as all that could be obtained for use in small sized valves, but they have been far from satisfactory since the desirably wide flow range and the equal percentage characteristics have both been sacrificed. The external contour of needle valve plugs is necessarily similar to that of a parabolic plug if desirable results are to be obtained, the essential difference being that the centro guide stem common to the parabolic plug is omitted in order to reduce the plug diameter and therefore no adequate guide means is possible. It will be understood that if a valve plug is provided with a centro guide stem, the diameter of the plug must be sufficient to allow for the stem displacement if the valve is to operate at rated capacity, and therefore the surface area of the plug just below the seat is relatively large and the leakage factor is increased so that the graduated range of flow change is correspondingly reduced. In the valve herein disclosed, the port arrangement is such that suitable guide portions having adequate strength for the purpose may be provided by standard machine tool equipment, such as circle convex and V cutters or equivalent grinders, and I regard this as one of the important features of my invention.

I am aware that valve plugs in the form of solid cylinders, variously ported, have been employed but, so far as known to me, the construction and arrangement of any of these valves is such that they are not only incapable of graduating fluid flow over a wide range on an equal percentage basis in respect to valve plug lift, but are not practical to manufacture in small sizes for this purpose.

Accordingly, it is an object of this invention to provide regulating valves which may be produced by practical methods and which may be characterized to vary fluid flow on an equal percentage basis in respect to plug lift.

It is an object of this invention to provide regulating valves which are capable of varying fluid flow over a wide range of flow change and at the same time of maintaining equal percentage flow characteristics through the flow range.

It is an object of this invention to provide regulating valves having an equal percentage flow characteristic wherein leakage flow in a position in which the valve is nearly closed is a small percentage of maximum flow.

And it is another object of this invention to provide regulating valves having an equal percentage flow characteristic including a valve plug having adequate guide portions combined with port areas which are ample to provide the flow capacity requirements of each valve size.

Further objects and advantages of this invention will be apparent from the following description when taken in connection with the accompanying drawings in which—

Fig. 1 is a vertical section of a control valve embodying my invention.

Fig. 2 is a diagrammatic view of a control system including the valve illustrated in Fig. 1.

Fig. 3 is an enlarged view, partly in section, of the valve plug and seat ring, shown in Fig. 1.

Figs. 4, 5 and 6 are perspectives of the valve plug as viewed from different angles.

Figs. 7, 8 and 9 are views showing different steps in the manufacture of the valve plug.

Figs. 10, 11 and 12 are transverse sections showing the valve plug at different valve openings in its seat ring, the section of the seat ring in each view being taken on the line X—X of Fig. 3.

Having reference to the drawings and particularly to Fig. 1, there is shown a control valve 10 which generally includes a valve body 11, a bonnet 12, mounted on the valve body, and a combined intermediate member and diaphragm motor 13 mounted on the bonnet and adapted to function in a well-known manner, to be described, the motor being suitably operated by fluid pressure, such as pressure directly controlled by the valve, or pressure as governed by a control mechanism conventionally illustrated in Fig. 2 by way of example of one form of control system in which the valve 10 may be utilized.

As illustrated in Fig. 2, the control valve 10 is used to govern the temperature of liquid in a vessel 15 having a heating coil 16 to which steam or other heating medium may be supplied through a pipe 17 in which the valve is mounted. The control mechanism may include a Bourdon tube 18 having a capillary connection 19 with a bulb 20 which is exposed to the temperature of liquid in the vessel 15, the parts being filled with expansible fluid in the usual manner. The Bourdon tube 18 has its free end connected with a rotatably mounted shaft 21 by means of an arm 22, and a second arm 23, secured to the shaft and having a slidably mounted block 24, is adapted to engage the free end of a flapper 25 which is pivoted at 26 and is arranged to cooperate with an exhaust nozzle 27. Operating fluid, such as air, may be supplied from a source not shown at a fixed pressure to the nozzle 27 by means of a pipe 28 having the usual restriction 29, the capacity of which is less than that of the nozzle so that the nozzle pressure in pounds per square inch is dependent on the relative position of the nozzle and flapper. As herein diagrammatically indicated, an increase of temperature at the bulb 20 rotates the arm 23 counterclockwise to lower the flapper 25 and increase the nozzle pressure and a decrease in temperature has the opposite effect.

A suitable relay valve diagrammatically indicated at 30, connected with the nozzle pressure by means of a pipe 31 and with the supply line 28 by means of a pipe 32, varies output pressure through a pipe 33 to the motor 13 of the control valve which operates in a manner to be described to vary the supply of heating medium to the coil 16 in the vessel. As herein shown the relay valve 30 is arranged so that an increase of pressure in the nozzle 27 provides a proportional increase of output pressure in the pipe 33 and vice versa. Liquid to be heated, such as water, may be supplied to the vessel 15 through an inlet 34 and may discharge therefrom at a selected temperature through an outlet 35 in quantities required by a source of demand, not shown.

Referring again to Fig. 1, the valve body 11 may be of one standard size such as is customary to use for a plurality of sizes of small valves, on the order of 1/8" to 3/4", inclusive, and may have an inlet connection 40, an outlet connection 41 and a partition wall 42 which serves to divide the interior of the valve body into inlet and outlet chambers 43 and 44, respectively. One side of the outlet chamber 44 is defined by a detachably connected blank flange 45 and the opposite side of the inlet chamber 43 is closed by a flange 46 which is detachably connected with the valve body 11 and is herein shown as integral with the bonnet 12. A seat ring 47 is threaded into a transverse opening in the partition wall 42 and includes a port 48 which affords a fluid connection between the inlet and outlet chambers 43 and 44, and a valve plug 50 cooperates with the port to vary fluid flow through the valve body in a manner more fully to be described.

The diaphragm motor 13 generally includes a fluid operating pressure chamber 51 one wall of which is defined by a flexible diaphragm 52, a stem 53 in operative connection with the diaphragm for actuating the valve plug 50 to be more fully described, and a spring 54 acting on the diaphragm in opposition to fluid pressure in the chamber 51. The spring 54 is enclosed in a housing 55 and is supported at one end on a lower spring button 56 which is threaded on an adjustment screw 57, the latter being threaded in turn into a suitable opening in a transverse partition 58 of the housing. The other end of the spring 54 abuts an upper spring button 59 which engages the lower end of a stem guide 60 slidably mounted in a lower diaphragm chamber member 61, the upper end of the guide being adapted to rest against a boss 62 of a diaphragm plate 63 at the lower side of the diaphragm 52. The diaphragm 52 is clamped at its periphery between the flanges of the lower diaphragm chamber member 61 and an upper diaphragm chamber member 64, as by bolts 65, and the diaphragm stem 53 extends through a central bore in the stem guide 60 and makes a sliding fit through a correspondingly disposed bore in the adjustment screw 57. The upper end of the housing 55 is flanged at 66 and secured to the lower diaphragm chamber 61 by studs 67, and the lower end of the housing is received over an extension 68 on the bonnet 12 and is clamped against a shoulder 69 on the bonnet by means of a locknut 70. Fluid under pressure may be supplied to the diaphragm chamber 51 through a connection 71 into which the pipe 33 is threaded and may be governed by the control mechanism in the manner described above, or be supplied from any selected source as will be understood by those skilled in the art. A suitable means for limiting the diaphragm to a selected range of over-all movement may be provided. A washer 72, which rests on a boss 73 of the lower diaphragm chamber member 61 and makes a sliding fit with the stem guide 60, is adapted to be engaged by the plate boss 62 to limit the downward movement of the diaphragm, and the upper spring button 59 is adapted to engage a lower surface 74 of the diaphragm chamber 61 to limit the upward movement of the diaphragm.

The valve plug 50 is in operative connection with the diaphragm stem 53 by means of a valve stem 75 which at one end is threaded and pinned at 76 to the valve plug and at the other end is threaded into the lower end of the diaphragm stem 53 and is secured thereto by locknuts 77. The valve stem 75 extends through a suitable bore disposed axially in the bonnet 12, leakage around the stem being prevented by the usual packing 78, gland 79 and follower nut 80 which is threaded over the bonnet extension 12. As herein shown, the valve is adapted to close on an increase of operating pressure in the diaphragm chamber 51. When the diaphragm pressure increases, the valve plug 50 is moved down against the force exerted by the spring 54 until the diaphragm plate boss 62 engages the washer 72 or, until the parts come to balance at an intermediate position; and as the operating pressure decreases, the valve plug is raised by the spring until the upper spring button 59 engages the lower surface 74 of the member 61, unless the parts again come to balance at some intermediate position. It will be understood that the pounds per square inch pressure change required to operate the diaphragm 52 throughout its stroke is determined by the effective diaphragm area, the over-all range of diaphragm movement and the characteristic of the spring 54, and that the initial spring loading or position of the band of operating pressure change within the spring range is determined by the adjustment screw 57.

Since, as outlined above, the fluid pressure in diaphragm chamber 51 may vary proportionally with a change in the temperature of the liquid in the vessel 15, and since the valve lift is linear with the pressure change, the effect of a change in fluid flow resulting from a change in pressure is dependent on the flow characteristic of the valve plug 50. If the flow change is linear with pressure change, the same quantity flow change occurs for each unit of pressure change throughout the plug lift, and therefore the effect of each unit of pressure change at wider valve openings for comparatively large fluid flows under higher load demands is less than the effect of a unit of pressure change at smaller valve openings for comparatively small fluid flows under lesser load demands. On the other hand, if the valve plug varies fluid flow on an equal percentage basis in respect to plug lift, the effect of each unit of pressure change is the same throughout the valve lift and therefore the control effect of a unit change in liquid temperature is substantially the same throughout the range of temperature change or, in other words, the control sensitivity is substantially uniform over the entire control range. And, as pointed out above, this principle applies whether large or small control valves are required to take care of the process demands. Recognizing this principle and with a view to meeting the requirements of control suited to small valves, a control valve embodying this invention is provided which is practical for construction in sizes less than one inch and which may be characterized to vary fluid flow on an equal percentage basis over a wide range of flow change with substantially accurate results.

Referring again to the drawings and particularly to Fig. 3, the valve plug 50 may be machined from a solid piece of stock. It includes a plug shoulder 81 having a bevelled seat 81' adapted to cooperate with a corresponding bevelled seat 82 on the seat ring 47, a cylindrical shank 83 of reduced diameter for attachment to the valve stem 75, and a cylinder portion 84 for governing fluid flow. The shank 83 is herein shown as integral with the plug shoulder and is threaded to receive the valve stem 75 and pinned at 76 as shown in Fig. 1 and described above. The cylinder portion 84 is also integral with the plug shoulder and extends therefrom into the bore or port 48 of the seat ring 47, the wall 85 of said portion being in parallel with the wall 86 of the seat ring port and adapted to make a practical working fit therewith allowing for machining tolerances and for expansion and contraction of materials caused by temperature changes. It has been found that a practical working clearance between the wall 85 of the cylinder portion and the wall 86 of the port permits a fluid flow amounting substantially to 2% of the valve capacity when the valve is just off its seat. It will be understood that this portion of the fluid flow, which may be termed leakage flow, is impractical to graduate and for this reason the rate of change of flow on an equal percentage basis starts with the leakage flow and is graduated to give maximum flow at maximum plug lift or, in other words, rate flow at rated plug lift. Therefore, it is important that the leakage flow is reduced to a small percentage of maximum flow if fluid flow is to be graduated over a wide range of flow change.

Referring to Figs. 4 to 9, inclusive, the port arrangement of the valve plug illustrated in Figs. 1 and 3 is therein more clearly shown. The ports, which are defined by recesses or grooves in the cylinder portion 84 of the valve plug and by the wall 86 of the seat ring, are three in number as indicated at A, B and C, respectively, and are disposed about the cylinder axis, shown in Figs. 7, 8 and 9 at 37 by a broken line, with their longitudinal center lines in planes radial to said axis and spaced at intervals of 120°. For convenience, recess A may be termed a maximum flow port, recess B a maximum-medium flow port, and recess C a maximum-medium-minimum flow port. Referring particularly to Fig. 4, recess A has a concave bed 87 and straight side walls 88 disposed in parallel with each other and with the axis 37 of the valve plug 50. The recess bed 87 is semi-circular in cross section and is of arcuate shape in longitudinal section so that it may be formed by a standard circle convex cutter or equivalent grinder 90 as indicated in Fig. 7. Recess A may be milled before recesses B and C, in which case it intersects the side wall 85 of the cylinder portion at a point 91 (see Fig. 7) and intersects the end wall 92 of said portion at a point 93 so that a line 94, shown dotted, which is tangential to the arc of the median line of the bed 87 at the point 91, is at a relatively large angle to the axis 37 and to the wall 85 of the plug.

The maximum-medium flow recess B (see Figs. 5 and 8) comprises a maximum flow portion 95 and an intersecting medium flow portion 96. The portion 95 is disposed in the cylinder portion 84 in a position similar to recess A but at an angle of 120° thereto and is adapted to be milled by a circle convex cutter similar to that shown at 90 in Fig. 7 so that it also has a concave bed and has straight side walls 106 in parallel with the cylinder axis and intersects the said axis as indicated. The medium flow portion 96 is an extension of the maximum flow portion 95 and has a V shaped bed which is disposed in the bed of the maximum flow portion 95 and divides a part of the bed into side portions 97 and 98 which are arc shaped in cross section. The V shaped bed of the medium flow portion 96 may be formed by a milling operation by means of a standard V cutter 38 shown in Fig. 8 and is provided with sides 99 which are inclined to one another and intersect at a bottom line 101 of the recess. As shown in Fig. 8, the bottom line 101 of the recess portion lies in a plane radial to the axis 37 of the valve member and inclined at an angle to that axis which angle is less than the angle formed with the axis by the tangential line 94, referred to above. The bottom line 101 intersects the side wall 85 at a point 102 which may be spaced substantially half the distance from the valve seat 81 that the point of intersection 91 of recess A is spaced from said seat.

The maximum-medium-minimum flow recess C (see Figs. 6 and 9) also comprises two portions, namely, a maximum flow portion 103 and a combined medium and minimum flow portion 104. The maximum flow portion 103 is adapted to be formed by a circle convex cutter shown at 90 in Fig. 7 and is positioned in the cylinder portion 84 in a manner similar to recess A and to the portion 95 of recess B, but at an angle of 120° thereto. The median line of the concave bed of the maximum flow portion 103 intersects the bed portions of recesses A and B at the axis 37 of the valve plug and this portion of recess C is also provided with straight side walls 107 which are in parallel with the valve plug axis. The medium-minimum flow portion 104 of recess C may be formed by a V cutter shown at 93 in Fig. 9 as an extension to the maximum flow portion 103 and has side walls 108 inclined to one another and intersecting at the bottom line 110. The bottom line 110 lies in a plane radial to the axis 37 of the valve plug and is inclined to that axis at an angle which is less than the angle formed by the bottom line 101 with said axis. The bottom line 110 is so disposed in relation to the axis that one end of the bottom line intersects the side wall 85 of the cylinder portion at a point 111 which may be substantially at the edge 112 of the seat 81. The other end of the bottom line intersects the median line of the bed of the maximum recess portion 103 at a point 109 which may be substantially midway radially between the axis 37 of the cylinder portion and the arc of its wall 85.

The arrangement of recesses A, B and C just described provides guide portions 115 each having, in cross section, two straight sides meeting at a radius of the circle defined by the cylinder portion 84, and an arc shaped side formed by the wall 85 of said portion. As illustrated in Fig. 3, the guide portions 115 are sufficiently long to extend well into the port 48 of the seat ring when the valve plug 50 is fully open and provide ample surfaces, equally distributed around the wall 86 of the seat ring, for guiding the valve plug throughout its entire stroke.

By reference to Figs. 10, 11 and 12 the port areas in transverse section provided at various valve plug positions may be visualized and serve to illustrate how the construction herein described lends itself to a change of port area with respect to plug lift. In Fig. 10 the valve plug 50 is shown at a position of lift exposing a part of recess C only. In Fig. 11 the valve plug is shown at a position of lift exposing parts of recesses C and B only. And in Fig. 12 the valve plug is shown at maximum lift, the combined areas of recesses A, B and C, serving to provide the maximum flow capacity of the valve.

By this combination of intersecting U shaped and V shaped recesses, fluid flow may be readily graduated on an equal percentage basis in respect to valve lift, the maximum capacity required for each valve size may be provided with a valve plug of minimum diameter, adequate guide portions to withstand the wear and tear of velocity fluid flow may be obtained, and the characteristics of each valve plug may be produced in quantity production by means of standard machine tool equipment.

While I have described in detail certain preferred embodiments of my invention, it will be understood that changes may be made without departing from the spirit of my invention as set forth in the appended claims.

Having thus described my invention, what I claim as new therein and desire to secure by Letters Patent of the United States, is:

1. In a valve for regulating fluid flow on an equal percentage basis in respect to valve lift comprising a body having a port, the combination with reciprocating means, of a valve plug actuated by said means including a cylinder slidably mounted in said port having a plurality of recesses disposed radially about the cylinder axis with guide portions therebetween, said recesses intersecting at one end and extending to the cylinder wall at the other end, a first and second of said recesses each having a bed portion disposed at a relatively wide angle to said axis, a third of said recesses having a V-shaped bed portion disposed at a lesser angle to the said axis, and one of said first and second recesses having a V-shaped extension disposed in the bed portion at a still lesser angle to the said axis, the combined cross-sectional area of said recesses as defined by their walls and by the wall of said port varying axially of said cylinder substantially on an equal percentage flow graduation basis in respect to valve lift.

2. In a fluid flow regulating valve including a body having a port, a valve plug comprising a cylinder slidably mounted in said port and having a plurality of flow recesses disposed radially about the cylinder axis and extending from the side wall to the end wall thereof with guide portions therebetween, a first and second of said recesses each having a bed portion disposed at a relatively wide angle to the cylinder axis, a third of said recesses having a V-shaped bed portion disposed at a lesser angle to the cylinder axis, and one of said first and second recesses having a V-shaped extension disposed in the bed portion at a still lesser angle to the cylinder axis, the combined cross-sectional area of said recesses as defined by their walls and by the wall of said port varying axially of said cylinder on an equal percentage flow graduation basis in respect to valve lift.

3. In a fluid flow regulating valve including a valve body having a port, a plurality of flow recesses disposed radially about the cylinder axis and extending from the side wall to the end wall thereof with guide portions therebetween, said recesses each having a concave bed portion disposed at a relatively wide angle to the cylinder axis, one of said recesses having a V-shaped extension disposed in the concave bed portion at a lesser angle to the cylinder axis, and another of said recesses having a V-shaped extension disposed in the concave bed portion at a still lesser angle to the cylinder axis, the combined cross-sectional area of said recesses as defined by their walls and by the wall of said port varying axially of the cylinder substantially on an equal percentage flow graduation basis in respect to valve lift.

4. In a fluid flow regulating valve including a valve body having a port, a valve plug comprising a cylinder having a portion slidably engaging the wall of said port and including a plurality of flow recesses radially disposed about the cylinder axis and extending from the cylinder side wall to an end thereof, the bed of one of said recesses meeting the cylinder side wall at a selected angle thereto and at a selected spacing from one end of the cylinder wall engaging portion, at least a portion of the bed of a second of said recesses being V-shaped and meeting the cylinder side wall at a lesser angle thereto and at substantially one half the aforesaid spacing from the said end of the cylinder wall engaging portion, and at least a portion of the bed of a third of said recesses being V-shaped and meeting the cylinder side wall at a still lesser angle thereto and substantially at said end of the cylinder wall engaging portion, the V-shaped bed portion of at least one of the two last mentioned recesses intersecting the remaining bed portion thereof, and the combined cross-sectional area of said recesses as defined by their walls and by the wall of said port varying axially of said cylinder substantially on an equal percentage flow graduation basis in respect to valve lift.

5. In a cylindrical valve member adapted to be slidably mounted in a valve port to graduate fluid flow through the valve, three equally spaced flow recesses disposed radially about the cylinder axis and extending from the side wall of the cylinder to the end wall thereof with guide portions therebetween, each of said recesses having an arcuate bed portion with its median line intersecting the cylinder axis, a continuation of an arc of said bed portion at one side of said axis intersecting the geometrical lateral surface of the cylinder and a continuation of the arc of said bed portion at the other side of said axis intersecting a geometrical base of said cylinder, a first intersecting bed portion extension gradually increasing in cross-sectional area from the cylinder side wall to one of said arcuate bed portions, and a second intersecting bed portion extension gradually increasing in cross-sectional area from said side wall to another of said arcuate bed portions, at least a part of each of said arcuate bed portions meeting said side wall at a relatively wide angle thereto, one of said first and second extensions meeting said side wall at a lesser angle thereto and the other of said extensions meeting the side wall at a still lesser angle thereto.

6. In a cylindrical valve member adapted to be slidably mounted in a valve port to graduate fluid flow through the valve, a plurality of U-shaped flow recesses disposed radially about the cylinder axis at a relatively wide angle thereto with guide portions therebetween, said recesses intersecting at one end and extending to the side wall of the cylinder at the other end, one of said recesses having a V-shaped extension disposed at a lesser angle to the cylinder axis, and another of said recesses having a V-shaped extension disposed at a still lesser angle to the cylinder axis, the combined cross-sectional areas of said recesses as defined by their walls and the wall of said port varying axially of said cylinder substantially on an equal percentage flow graduation basis in respect to valve lift.

7. In a fluid flow regulating valve including a valve body having a port provided with a seat, a valve plug comprising a cylinder slidably engaging the wall of said port and having a seat at one end of the wall engaging portion cooperating with the port seat, said cylinder having three flow recesses bedded therein centered in planes radial to the cylinder axis and extending from the cylinder side wall to the end nonadjacent to the plug seat with guide portions therebetween, the bed of one of said recesses and a portion of the bed of the remaining recesses being concave in cross section and intersecting at the cylinder axis at corresponding angles thereto, the concave bed of said first mentioned recess meeting the cylinder wall engaging portion at a selected angle thereto and at a selected spacing from the cylinder seat, a portion of the bed of one of said last mentioned recesses being V-shaped in cross section and meeting the cylinder wall engaging portion at a lesser angle thereto and at substantially one half the last mentioned spacing from the said plug seat, and a portion of the bed of the other of said remaining recesses being V-shaped in cross section and meeting the cylinder wall engaging portion at a still lesser angle thereto and substantially at the said plug seat, the combined cross-sectional area of said recesses as defined by their walls and by the wall of said port varying axially of said cylinder substantially on an equal percentage flow graduation basis in respect to valve lift.

RALPH A. ROCKWELL.

REFERENCES CITED

The following references are of record in the file of this patent:

UNITED STATES PATENTS

| Number | Name | Date |
|---|---|---|
| 45,390 | Cresson | Dec. 13, 1864 |
| 1,806,565 | Russel | May 19, 1931 |
| 1,952,683 | Resek | Mar. 27, 1934 |
| 2,106,300 | Harrison | Jan. 25, 1938 |
| 2,117,182 | Lewis | May 10, 1938 |
| 2,321,000 | Bennett | June 8, 1943 |

FOREIGN PATENTS

| Number | Country | Date |
|---|---|---|
| 45,599 | Denmark | of 1932 |